United States Patent [19]
Furegati

[11] 4,217,800
[45] Aug. 19, 1980

[54] STOCK-FEEDING APPARATUS

[75] Inventor: Marcel Furegati, Zurich, Switzerland

[73] Assignee: Hydaira-Coreal AG, Switzerland

[21] Appl. No.: 808

[22] Filed: Jan. 4, 1979

[30] Foreign Application Priority Data

Jan. 10, 1978 [CH] Switzerland .............................. 220/78
Nov. 22, 1978 [CH] Switzerland ........................ 11976/78

[51] Int. Cl.$^3$ .......................... B23B 13/00; B23Q 5/22
[52] U.S. Cl. .......................................... 82/2.5; 414/14
[58] Field of Search ....................... 82/2.5, 38 R, 38 A; 414/14, 15, 16, 17

[56] References Cited

U.S. PATENT DOCUMENTS 2,300,457  11/1942  Mariotte .................................. 414/17

FOREIGN PATENT DOCUMENTS 2533502  1/1977  Fed. Rep. of Germany ............. 82/2.5
984625   3/1965  United Kingdom ....................... 82/2.5

*Primary Examiner*—Harrison L. Hinson
*Attorney, Agent, or Firm*—Lerner, David, Littenberg & Samuel

[57] ABSTRACT

A stock-feeding apparatus is provided for conveying rod stock to a processing machine and includes a guide tube pivotally mounted on two spaced-apart supports, with the guide tube being movable between a loading position and a feeding position. Mounted within the guide tube is a fluid-activated first piston having a holder at one end for holding the end of the rod stock. Mounted within the first piston is a second piston which includes a piston rod for pushing the rod stock into the processing machine. In addition, a revolving guide element is mounted in the guide tube between the second piston and the processing machine to limit buckling of the rod stock to be processed.

12 Claims, 7 Drawing Figures

STOCK-FEEDING APPARATUS

FIELD OF THE INVENTION

The present invention relates generally to stock-feeding apparatus and specifically to improved apparatus which includes an inner piston mounted within an outer piston, both for feeding the stock material to a processing machine.

BACKGROUND OF THE INVENTION

Devices for conveying rod-shaped pieces of material to a lathe are known in the art. In one arrangement shown in DE-AS 1,477,466, predetermined lengths of the rod-shaped material are stacked in a magazine. The predetermined lengths are inserted into the chuck of a processing machine, such as a lathe, and are removed after processing by means of a simple piston-plunger unit. The apparatus also includes a magnetic circuit and a fluid regulator. Such an arrangement has the drawback that the guide is of insufficient length for feeding long-stock material, since the piston is shown to have a relatively short path of travel.

Another example of a prior art device shown in DE-Gm 7,033,159 which includes a long, one-piece piston for conveying the rod-stock material. In addition, the piston has a very short mounting at the insert end of the device which is undesirable because of the possibility of damage to the piston and cylinder.

Accordingly, it is a broad object of the present invention to provide an improved device which overcomes one or more of the aforesaid problems. Specifically, it is within the contemplation of the present invention to provide a device for feeding stock material which is significantly simple in its construction and is economical but is yet highly dependable.

It is a further object of the present invention to provide an improved apparatus for feeding stock material which avoids undesirable buckling of the stock material during the feeding operation.

SUMMARY OF THE INVENTION

Briefly in accordance with the principles of the present invention, an improved apparatus is provided for conveying rod-stock material to a processing machine, wherein the device includes a rod guide tube pivotally mounted on two-spaced apart supports for movement between a loading position and a feeding position. The guide tube is moved to the loading position to receive the rod-stock material, and then the device is pivoted to its feeding position for feeding the stock material into a processing machine, such as a lathe. A fluid-activated first piston is mounted in the guide tube for movement therein to feed the stock material to the processing machine. In addition, the first piston includes a holder mounted therein for holding one end of the rod-stock material to feed it to the processing machine. The first piston includes a member forming a cylinder for receiving a second piston, and the second piston includes a piston rod for pushing the rod stock to the processing machine. The guide tube further includes a revolving guide element mounted in the guide tube between the second piston and the processing machine to limit buckling of the rod stock to be processed.

Advantageously, the device of the present invention is capable of feeding even thin rod-stock material without undesirable side effects, such as buckling. In addition, the processing time is reduced, as well as the noise produced.

BRIEF DESCRIPTION OF THE DRAWINGS

Further objects, features, and advantages of the present invention will become apparent upon the consideration of the following detailed description of a presently-preferred embodiment when taken in conjunction with the accompanying drawings, wherein.

DETAILED DISCUSSION OF PREFERRED EMBODIMENTS OF THE INVENTION

Figure 1:
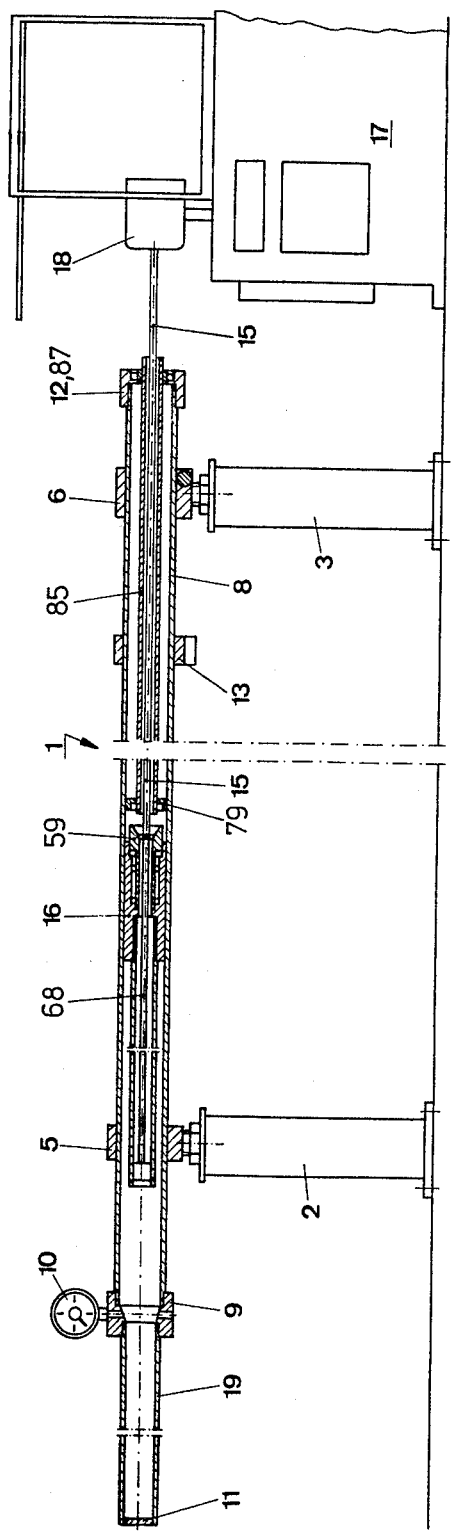
FIG. 1 shows an elevational view, partially in section, of a device for feeding stock material to an automatic lathe, embodying the principles of the present invention.
Figure 2:
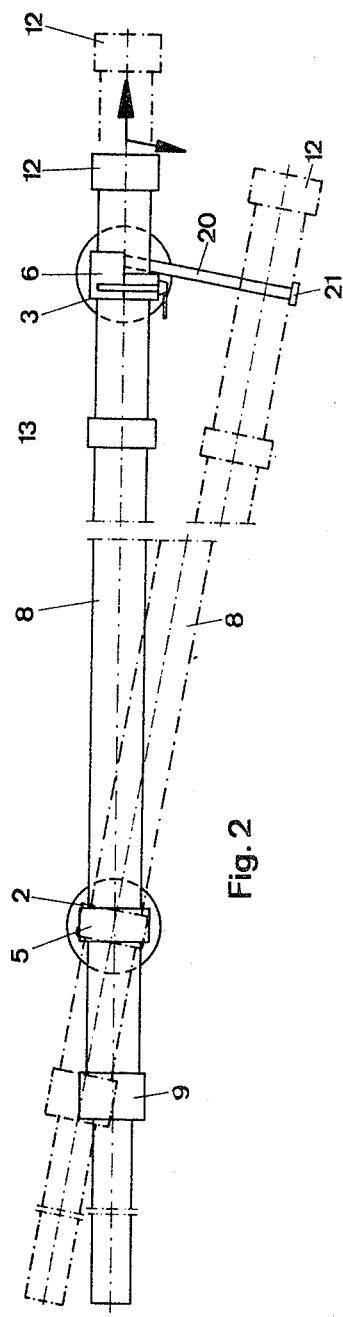
FIG. 2 is a schematic representation of the device in the feeding position and is shown in doted line in its loading position.

The construction of the present invention is evident from FIGS. 1 and 2. These show a feed mechanism 1, which is supported on two pivots 5, 6 and two supports 2, 3. These pivots 5, 6 serve to mount a guide tube 8, which has the function of a pneumatic or hydraulic cylinder. The rear end of the guide tube 8, which is open at both ends, is equipped with a pressure gauge 10 by an intermediate coupling 9. A tube 19, with a smaller diameter, is screwed into this intermediate coupling 9. The free end of this tube 19 is closed by means of a screw lid 11. This tube 19 is tightly screwed shut by means of a gasket. The front end of the guide tube 8, that facing the machine tool or the automatic lathe 17, is equipped with a piston impact lid 12. An adjustable check ring 13 is attached to the guide tube 8, and a moving piston 16 slides adjustably in the interior of the guide tube 8, which is shaped as a cylinder.

The end of the moving piston 16 which faces the automatic lathe 17 is constructed for friction holding of a rod 15 to be processed in the automatic lathe 17. The guide 18 of the automatic lathe 17 to the lathe chuck for inserting the rod 15 is schematically represented. The pivot 6 is equipped with a cross piece 20, whose free end has a buffer 21. In FIG. 2, the guide tube is shown in its extended position in dotted lines in one of its operating positions. In addition, guide tube 8 is shown in solid line in its feeding position, and its loading position is shown by dotted lines, where the guide tube 8 is ready for insertion of a new rod.

Figure 3:
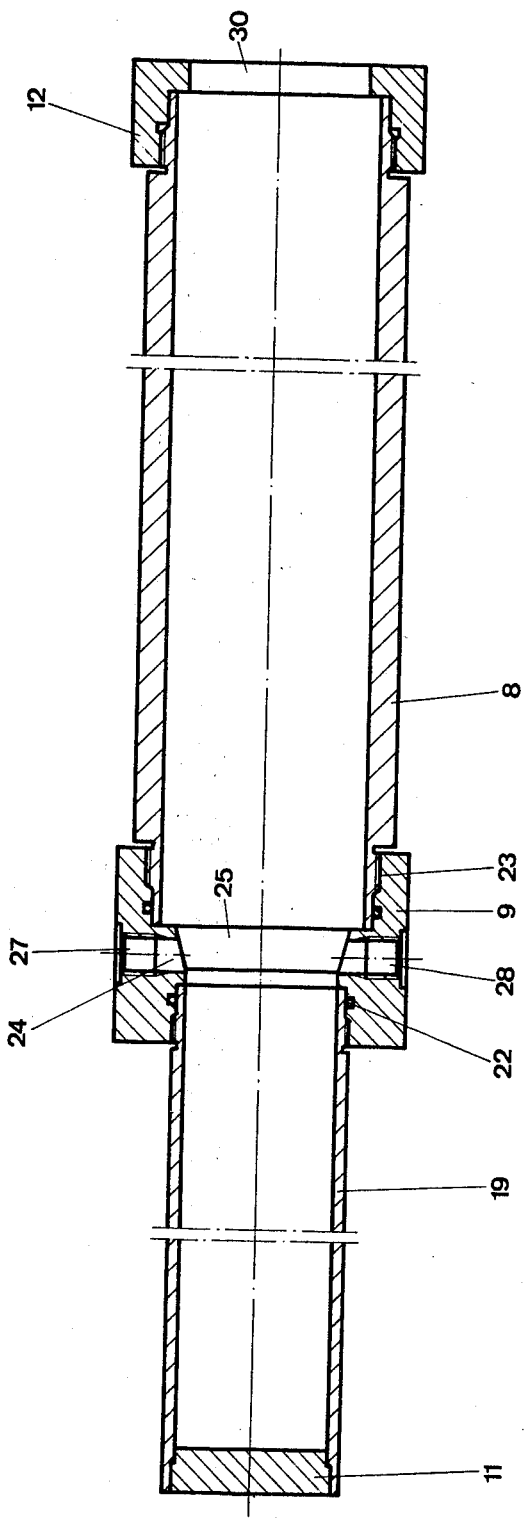
FIG. 3 is a cross-sectional view showing the length of the guide tube.

In FIG. 3, it can be seen that the intermediate coupling 9, as well as the corresponding end of the guide tube 8, are provided with a thread 29. Furthermore, the coupling 9 also has a crosswise bore 24, as well as a lengthwise bore 25 which branches off from it and empties into the guide tube 8. One side connection of the cross bore 24 serves to attach the pressure gauge 10 by means of a pressure gauge connector 24, while the other connection 28 is equipped with an appropriate thread for the pressure medium, especially compressed air. The protector tube 19, which is screwed into the coupling 9, allows the guide tube 8 to be opened to attach the cylindrical extension 70 to the moving piston 16, as will be explained. The end of the piston impact lid 12 which faces the automatic lathe is also threaded, as is the lid itself. The lid 12 has a center rod opening 30.

Figure 4:
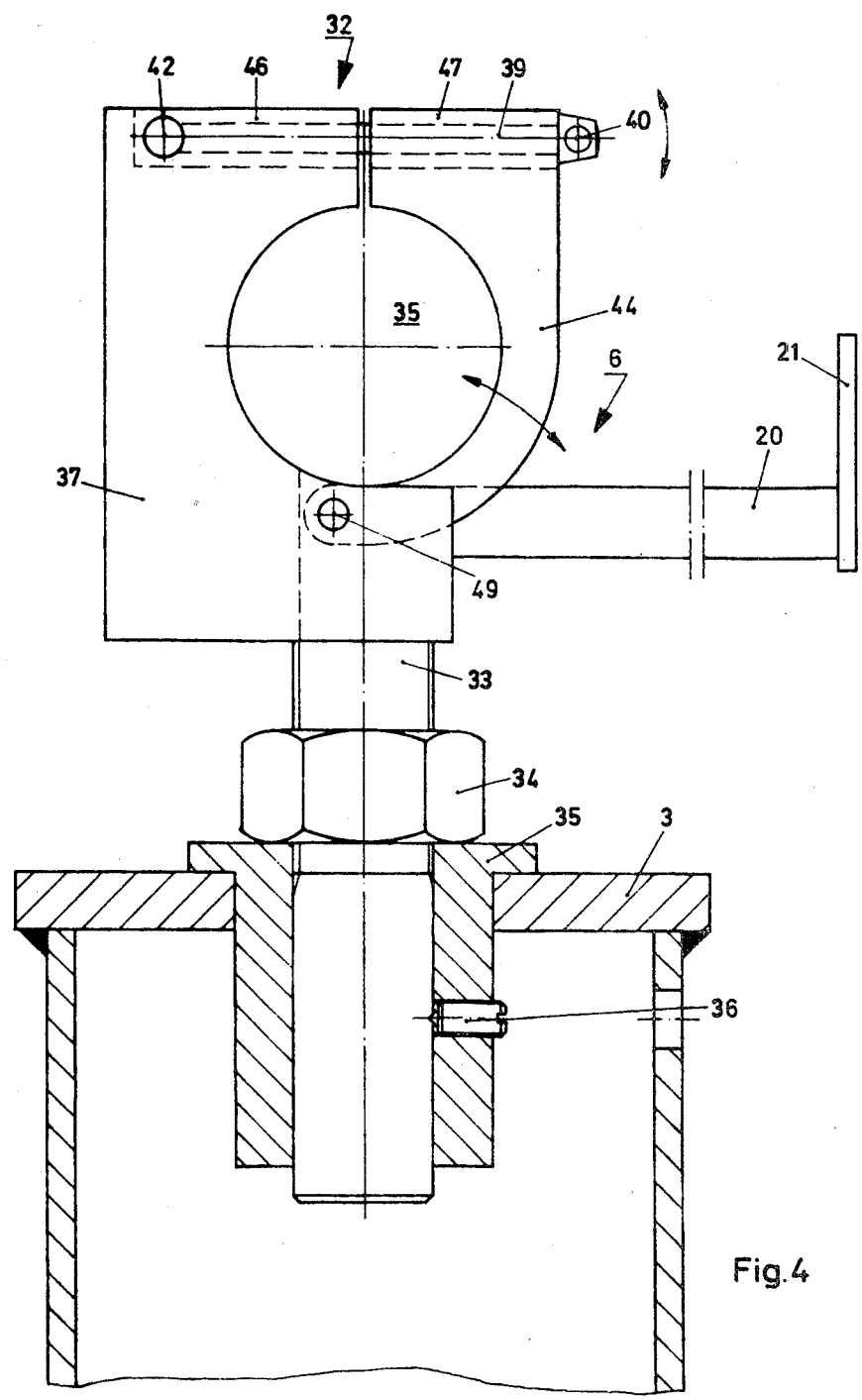
FIG. 4 is an elevational view, partially in section, showing a pivot support for the guide tube.
Figure 5:
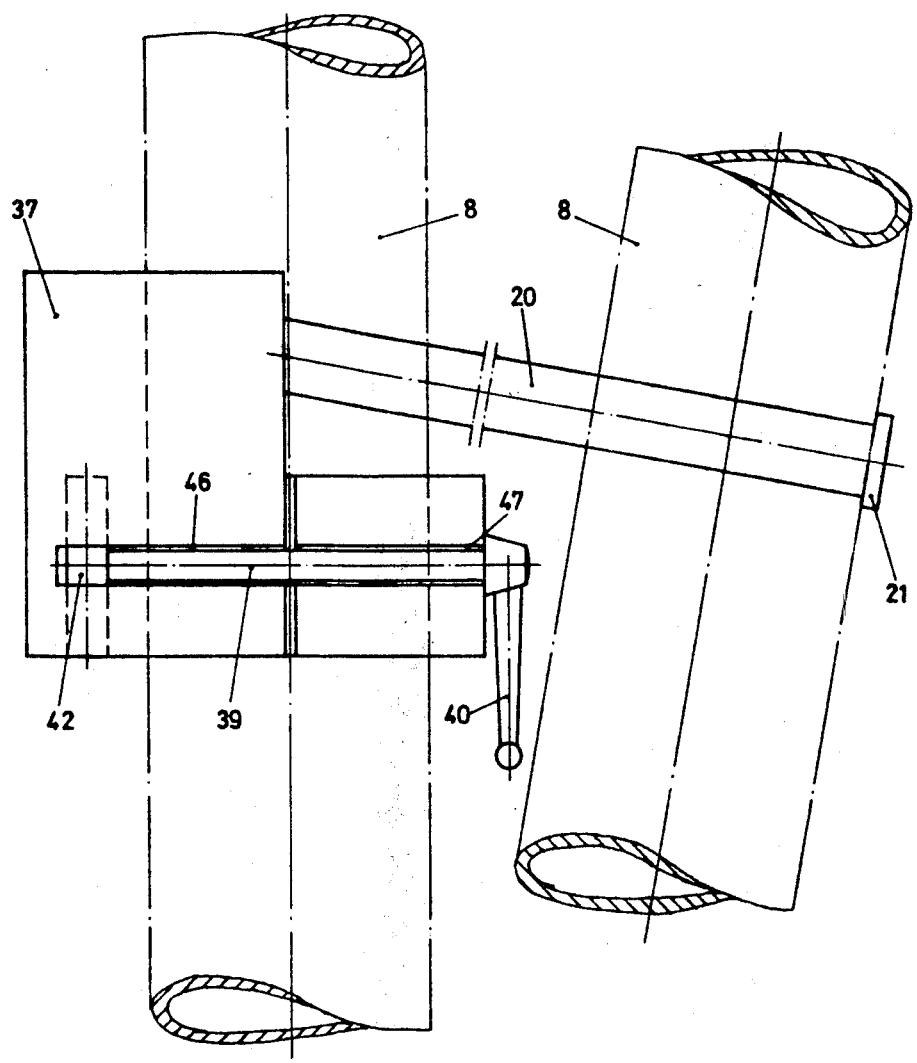
FIG. 5 is a plan view showing the tube in its loading position and feeding position.

As shown in FIGS. 4 and 5, the pivot 6 is built as a clamp 32. A threaded bolt with an adjusting nut 34 serves to mount the pivot 6 and its bearing on a bearing box 35 of support 3. The fixed part 37 of the clamp 32 serves to attach a threaded spindle 39, with a nut lever 40 screwed onto its free end. The spindle 39 is swivel mounted on the fixed part 37 by means of a cross bolt 42. The clamp 32 has a swivel part 44. Both parts 37 and 44 are equipped with grooves 46 and 47, open to the top, and the threaded spindle 39 can be swiveled into and out of these grooves after the nut lever has been appropriately activated. The swivel part 44 is attached to the fixed part 37 by means of a bolt 49 so that it can be swiveled down. The clamp 32 serves to hold the guide tube 8 which is cylindrically shaped. The pivot 6 can be adjusted in height and adapted to the dimensions of the machine tools used, by means of the adjusting nut 34 and the threaded bolt 33. A torsion protector, e.g., a threaded pin 36, protects the threaded bolt against torsion.

Figure 6:
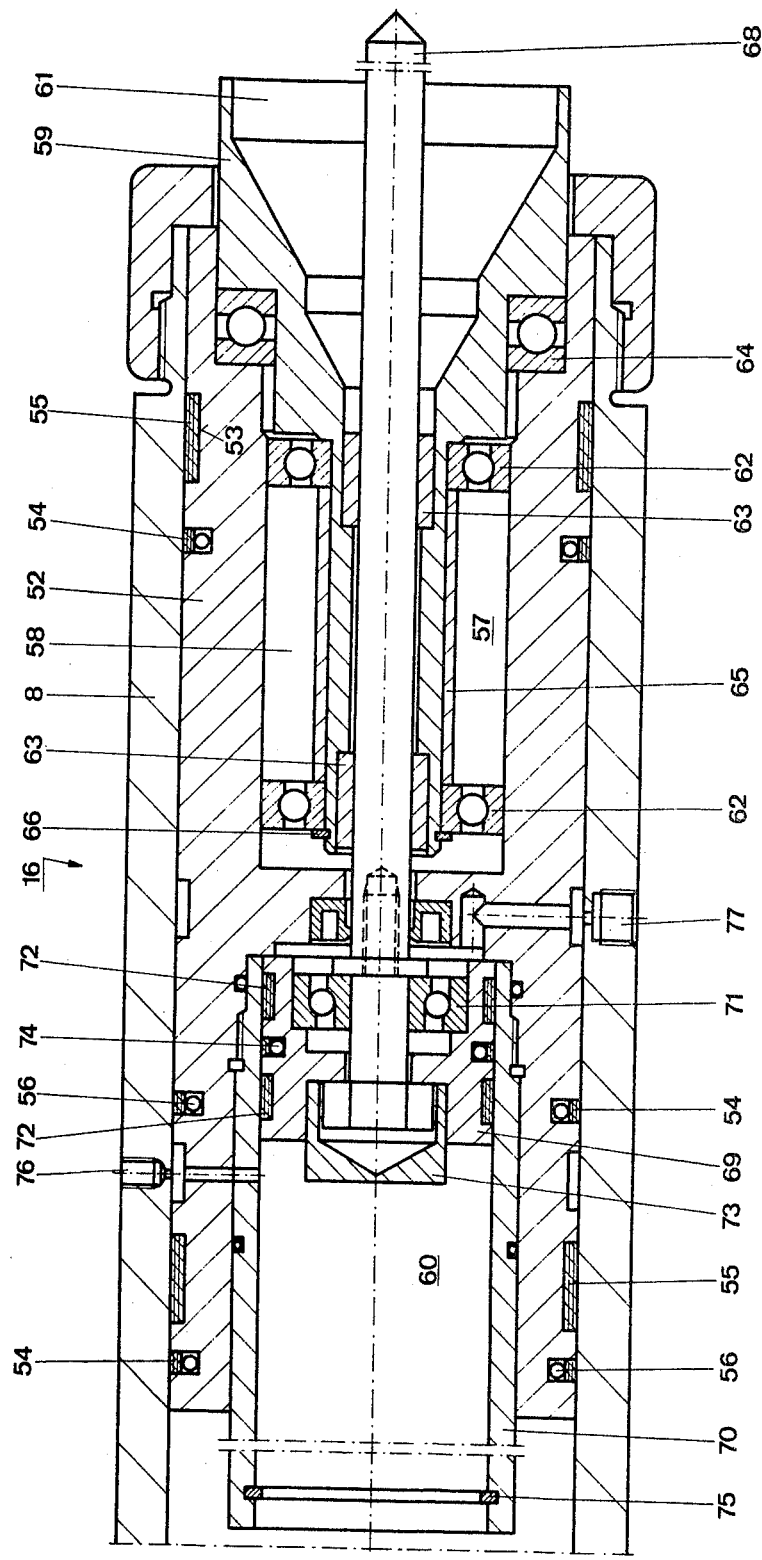
FIG. 6 is a cross-sectional view illustrating in detail the movable pistons in the guide tube of the present invention.

The moving piston 16, shown in FIG. 6 in lengthwise cross section moves in the guide tube 8. It consists of a primary piston body 52, which has a peripheral groove 53 and three bands 55 lathed into the groove at either end of the piston. Other grooves 53 serve to hold guide bands 54, while piston ring gaskets 56 are placed beneath bands 54. The piston body 52 has a stepped bore 58 with two cylinder chambers 57, 60. On its exterior, free end, a holder 59 is inserted within a stepped opening 61 and is constructed for the insertion of a rod 15. The holder 59 is mounted in two ball bearings 62 in the chamber 57 of the piston body 52. Another ball bearing 64 serves to take up the axial feed. The holder 59 can be turned with very little friction in the piston body 52, which is necessary due to the motion of the rod 15 which is inserted in the opening 61. There is a bearing spacer between the two bearings 62. This assembly is secured axially by means of a Seger ring or fusion ring 66. The guide bands 55 and the piston ring gaskets 56 are preferably made of PTFE material, which has good antifriction properties and seals the moving piston well with regard to the guide tube 8, due to its rubber-elastic properties.

Two pivot bushings 63, e.g., made of bronze, are pressed into the interior of the holder 59 in the area of the two ball bearings 62, which serve to axially guide a piston-type ejection rod 68. This rod 68 is attached so it can be turned in a second piston 69. The revolving mount of the rod 68 is accomplished by means of a ball bearing 71. The piston 69 is adjustable lengthwise in the chamber 60 and is mounted in the cylinder tube 70, which is tightly screwed into the piston body 52. It is equipped with two guide bands 72, as well as a ring gasket 74. The rear, open end of the piston 69 serves to hold the rear end of the rod 68. This space is closed by means of a lid 73. The piston 69 is limited in its backward travel by a Seger ring 75 in the tube 70. Two further pressure medium connections 76, 77 are provided to control the piston 69 and the rod 68.

As can be seen in FIG. 2, the rear pivot 5 is attached to the support 2 so it can be swiveled about a vertical axis. In the same manner, the pivot 5, just as the pivot 6, is adjustable in height. This is necessary in order to swivel the guide tube 8 into its loading position, as shown by dotted lines. The vertical adjustment serves to adapt the pivot 5 to the feed 18 of the automatic lathe 17. The guide tube 8 is a precision steel tube with a finely-processed bore, as is usual for piston-cylinder units. Its length is chosen to be such that rods 15 of a normal, commercially-standard length can be processed. The wall dimensions of the guide tube 8, as well as its free length between the two supports 2, 3, is chosen to be such that no vibrations of the guide tube itself can be caused by the rotation of the rod 15. On the contrary, any possible vibrations of the rod 15 are absorbed by the guide tube 8. In order to be able to adjust the guide tube 8 in an axial direction within desired limits, and to adapt it to the circumstances, the check ring 13 is provided, which limits the possible adjustment distance towards the automatic lathe 17. The outer diameter of the guide tube 8 is set corresponding to the length of the adjustment distance, which can be set with the check ring 13, where the set length determines the maximum possible adjustment distance.

Figure 7:
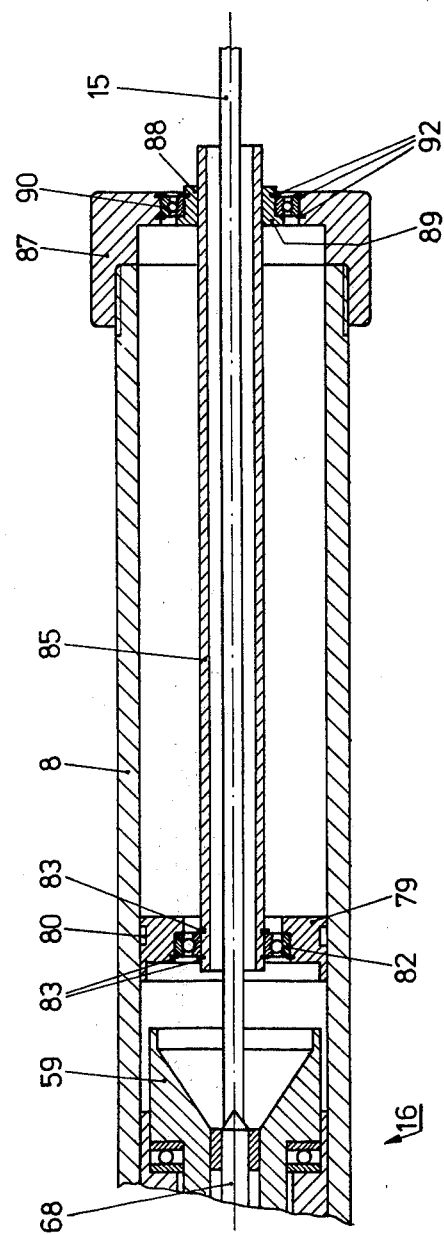
FIG. 7 is a cross-sectional view of another embodiment to the present including apparatus for guiding thin rods.

Referring to FIG. 7, there is shown in detail a lengthwise cross section through the two-piston unit adjustably placed in the tube for the feed of rod material, which basically corresponds to the construction according to FIG. 6. Since thin rod material to be processed buckles easily at greater spans, possibly causing collisions with and damage to the feed mechanism, a piston 79 is placed in the guide tube 8 in front of the moving piston 16, which limits this buckling. This piston has a guide ring 80 on its circumference. A ball bearing 82 is built into a center opening of the piston 79 and mounted by means of a Seger ring 83, as well as a corresponding shoulder in the piston 79. The interior ring of the ball bearing 82 is seated in a buckle guide tube 85, and this tube is secured axially by means of two Seger rings 83.

The front closure of the guide tube 8 is a cover lid 87, which has a central opening for inserting a ball bearing 90. To support the inner ring of the ball bearing, the guide tube 85 has a mounting ring 88 with a shoulder 89 for securing the inner ring of the ball bearing 90 axially. This ring is secured externally by a Seger ring 92. The outer ring of the ball bearing is secured in an analogous fashion on a shoulder of the lid 87, as well as by means of another Seger ring 92.

When the rod material to be processed is thin and has a large buckling length, it tends to buckle radially while being fed into the lathe. In order to hold this buckling within acceptable limits and to minimize additional friction losses, which can occur from the buckled material (when it rubs against fixed parts), the buckle guide tube 85 is mounted so that it revolves in the ball bearings 82, 90. Therefore, when the rod 15 buckles, the tube 85 turns with it. Only a slight rubbing of the ball bearing occurs, causing an additional strain on the drive. Also, the small interior diameter of the buckle guide tube 85 permits only slight buckling, so that even the thinnest rod stock can be conveyed with this device without causing undesirable side effects.

By using the appropriate mounting rings in the piston, as well as in the cover lid, the guide tube 85 can be interchangeable, so that it can be changed for different diameters of the rod stock.

When feeding the rod stock, the piston 79 is pushed against the lid 87, and the buckle guide tube 85 glides in the mounting ring 88, thereby securing the rod stock against excess buckling during the entire feed process along the length of the tube 85.

The moving piston 16 has a precise and smooth forward motion with as little stationary friction as possible, in order to avoid jerky movements of the rod. The pneumatically or hydraulically-activated moving piston 16 is sealed primarily by the three O-rings with PTFE sealing bands 56, while the two spaced-apart guide bands 55 function especially to guide the piston 16 in the guide tube 8. The funnel-shaped holder 59 is made of steel. It is hardened, and the ball bearing seats are ground. The control of the device, e.g., pneumatic control, can be accomplished in several ways. Since it is not part of the invention, it will not be described below. Such controls can be built into the device itself according to known designs.

In addition, the present invention can be built onto automatic lathes, revolving automatic lathes, saws, presses, and similar machine tools, as a feed mechanism for rod stock.

The apparatus of the invention is designed so that the person operating the machine has very little to do with the material feed. In order to insert a new rod 15, the rod guide tube 8 is pivoted sideways relative to the front support 3 by means of a laterally-extending cross piece 20. A new rod is placed into holder 59 of the moving piston 16. The controls are set at "pressure-free conditions" behind the piston 16, and the piston 16 is pushed back by hand, with the new rod 15. In this starting position, the piston guide tube 70 extends into the protector tube 19. The rod guide tube 8 is then pivoted back into feeding position and locked in place. Pressure medium is conducted into the space behind the piston 16 using the controls, and the required pressure is created. The rod stock 15 is then pushed forward automatically until the piston 16 engages lid 12 at the front end of the tube 8. Then, the piston 69 is pushed forward, and the piston rod 68 pushes the rest of the rod 15 out of the device into the lathe chuck. When the second piston 69 is in its farthest forward position, the controls are activated by means of connection 77. The piston 69 receives an impulse therefrom and moves back to its farthest rear position. At the same time the automatic lathe is turned off, e.g., by a pneumatic/electric signal changer. Then, the guide tube 8 is pushed back into its rest position by hand. This ends the cycle, and the pistons 52, 69 are in position to be started again. Of course, the process can be further automated by using suitable additional devices.

The actual working efficiency of the device of the present invention is achieved as follows:
- The simplified design, as well as careful, precise construction of the device, place the least possible demands on operation and therefore require the shortest possible idle times for the machine and the operator.
- The height of the feed is never adjusted and therefore never needs to be manipulated or checked by the operator.
- The setting and control of the feed power of the feed piston are carried out in the simplest manner possible, by means of a pressure regulator vent and a pressure gauge. The operating pressure can be read off of the pressure gauge at any time.

During the running time of the machine, the piston 52 with the holder 59 is under constant pressure and centers the the rod stock in such a manner that shocks are reduced to a minimum. The results are:
- reduced noise,
- higher rpm's, i.e., shorter processing times,
- longer service life of the machine,
- better lathe finish of the piece processed,
- capability of extremely varied processing, especially rods having thin profiles, without damage to their edges,
- capability of processing rods having unbalanced profiles, whose turning axes do not extend through their center of gravity.

Also, machine tool construction need no longer include guides in its expensive machines, since the machine and accessory described above solve all these guide problems. The same applies for the supply elements.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A device for conveying rod stock to a processing machine, comprising a rod guide tube, a fluid-activated first piston axially movable in the rod guide tube, said first piston having a rotatable centering holder for holding one end of the rod stock, said first piston including a member forming a cylinder for receiving a second piston, said second piston being movably mounted relative to said first piston and including a piston rod for pushing the rod stock to said processing machine, said piston rod extending through said holder for engaging said rod stock.

2. A device according to claim 1, further including a revolving guide element mounted in said rod guide tube between said second piston and said processing machine to limit buckling of the rod stock to be processed.

3. A device according to claim 2, wherein said piston rod is rotatably mounted relative to said second piston.

4. A device according to claim 2, further including means for moving said second piston after said first piston has moved to the end of said rod guide tube.

5. A device according to claim 2, further including means for moving said rod guide tube between a loading position and a feeding position.

6. A device according to claim 2, further including means for supporting said rod guide tube for axial movement.

7. A device according to claim 6, further including means for limiting the axial movement of said rod guide tube.

8. A device according to claim 7, wherein said limiting means is a setting ring.

9. A device according to claim 5, wherein said moving means includes two supports for pivotally supporting said rod guide tube.

10. A device according to claim 2, wherein said guide element includes a tubular member for receiving said rod stock, said tubular member being rotatably mounted and axially adjustable relative to said rod guide tube.

11. A device according to claim 2, wherein said guide element includes a third piston and a tubular member rotatably mounted relative to said third piston.

12. A device for conveying rod stock to a processing machine, comprising a rod guide tube, a fluid-activated first piston axially movable in the rod guide tube, said first piston having a rotatable centering holder for holding one end of the rod stock, said first piston including a member forming a cylinder for receiving a second piston, said second piston being movably mounted relative to said first piston and including a piston rod for pushing the rod stock to said processing machine, and a revolving guide element mounted in said rod guide tube between said second piston and said processing machine to limit buckling of the rod stock to be processed.

* * * * *